June 19, 1962

R. C. RISNER 3,039,813

AUTOMOBILE CARRIERS

Filed Nov. 12, 1957

INVENTOR
ROBERT C. RISNER

BY *Ogle R. Singleton*

ATTORNEY

INVENTOR
ROBERT C. RISNER
BY *Ogle R. Singleton*
ATTORNEY

June 19, 1962 R. C. RISNER 3,039,813
AUTOMOBILE CARRIERS
Filed Nov. 12, 1957 3 Sheets-Sheet 3
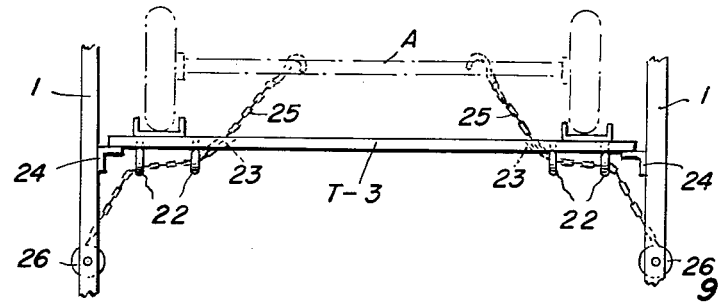
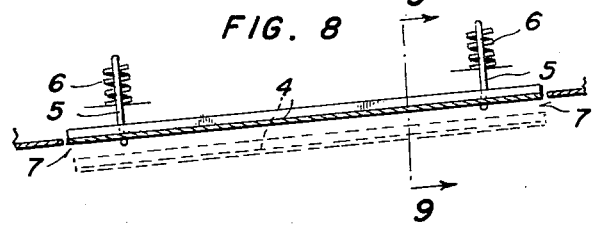
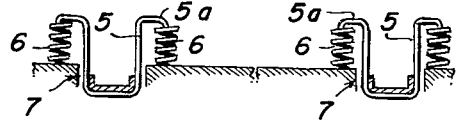
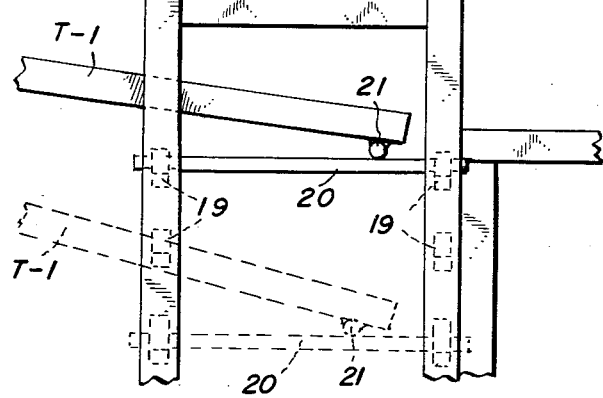
INVENTOR
ROBERT C. RISNER
BY *Ogle R. Singleton*
ATTORNEY

United States Patent Office 3,039,813
Patented June 19, 1962

3,039,813
AUTOMOBILE CARRIERS
Robert C. Risner, 8102 Dalesford Road, Towson, Md.
Filed Nov. 12, 1957, Ser. No. 695,952
2 Claims. (Cl. 296—1)

My invention consists in a new and useful improvement in automobile carriers and constitutes a considerable improvement over the carrier disclosed and claimed in my application Serial Number 652,222, now Patent No. 2,908,527. The carrier hereinafter disclosed and claimed is designed, as are all of my carriers, to carry five automobiles on a single trailer. The improved features hereinafter disclosed and claimed are (1) there are two supports for the rear bridge so that the bridge can be adjusted relative the rear gate for adjustment of the skids therebetween according to the wheel base of the automobile to be loaded on the bridge and the skids; and (2) the supports for the forward bridge have means for holding a swingable section of the intermediate trackway in adjusted positions.

The foregoing features materially improve the capacity of the trailer because (1) by adjustment of the skids between the rear bridge and the rear gate an automobile of considerably greater wheel base can be loaded thereon, and (2) by use of the holding means on the support of the forward bridge, the swingable section of the intermediate trackway can be fixed in adjusted positions to properly position the automobile on said section between the automobile above and the automobile below the automobile on said section.

As will further appear, the carrier hereinafter disclosed and claimed is an all-purpose carrier, designed to be loaded with any combination of automobiles, station wagons, pick-up trucks, buses, ambulances and hearses.

While I illustrate in the drawings and hereinafter fully describe one specific embodiment of my invention, it is to be distinctly understood that I do not consider my invention to be limited to said embodiment but refer for its scope to the claims appended hereto.

In the drawings:

FIG. 6 is an enlarged vertical section on the line 6—6 of FIG. 1, in the direction of the arrows.

FIG. 7 is an enlarged, fragmentary, side elevation of the forward bridge on its supporting posts.

FIG. 8 is an enlarged, fragmentary, longitudinal section of one of the spring mounted portions of the lower trackway on the chassis of the trailer.

FIG. 9 is a vertical section on the line 9—9 of FIG. 8, in the direction of the arrows.

Figure 1:
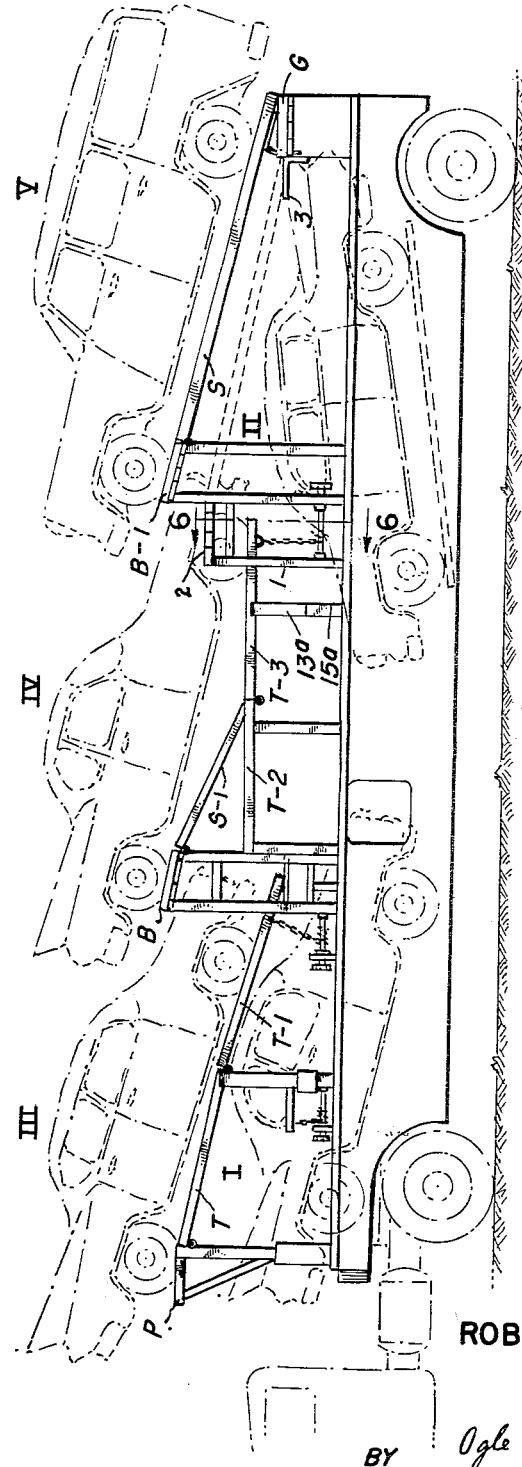
FIG. 1 is a side elevation of my improved carrier, loaded with four automobiles and a station wagon.

As shown in the drawings, the carrier of this application has a platform P, an intermediate trackway comprising a hinged portion T, a hinged portion T-1, a fixed portion T-2 and a hinged portion T-3, removable skids S, a rear gate G, a forward bridge B and a rear bridge B-1.

There are two posts 1 on the sides of the carrier, respectively, spaced forwardly of the other posts, to support a pair of hinges 2 on the sides of the carrier, respectively, for mounting the bridge B-1 in a forward position. A pair of brackets 3, mounted on the supports of the gate G, extend forwardly thereof for carrying the ear ends of the skids S.

In the carrier, a lower trackway has a pair of spring-mounted portions 4 at its rear end (FIGS. 8 and 9). Each portion 4 has each end carried by a cradle 5 having each of its ends 5-a carried by a spring 6 mounted on the side of a trough 7 in the bottom of the chassis of the carrier.

A rod 8 is slidably and rotatably mounted in one of the posts O for the bridge B, one of its ends 8-a being bent at right angles, and its other end 8-b having a nut 9 threaded thereon and bearing on an expansion spring 10 bearing on the post O. On the end 8-a there is mounted a ball 11 serving as a male member for a female member 12 mounted on the underside at one end of the bridge B, to form a conventional towing hitch. A bracket 13 is mounted on the rear face of the post O slightly below the rod 8, to support the bridge B when it is in the position of FIG. 5. A pair of brackets 14 is mounted on one of the posts 1 for the rear bridge B-1, in horizontal alignment with the bracket 13. An ear 15 projects upwardly from the top of the post 1 carrying the brackets 14. Suitable registering bores in the bridge B and the ear 15 provide a passage for a bolt 16 with a head on one end and a cotter pin 17 on the other end for removably attaching the bridge B to the ear 15 when the bridge B is in the position of FIG. 5.

Figure 2:
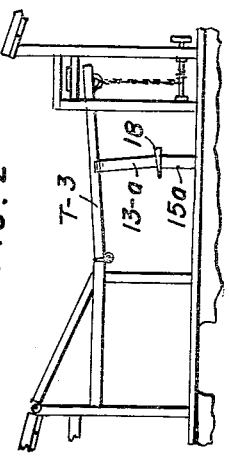
FIG. 2 is a fragmentary, side elevation of a portion of the intermediate trackway.

The section T-3 of the intermediate trackway (FIG. 2) is carried on an arch 13-a supported on posts 15-a, and wedges 18 are provided to be inserted between the posts 15-a and the arch 13-a to fix the section T-3 in adjusted positions.

As shown in FIG. 7, a series of pairs of brackets 19 are provided on the supports for the bridge B and a pair of rods 20 can be positioned in registering brackets 19 on each side of the carrier, and a transverse rod 21 on the underside of the rear end of the hinged section T-1 of the intermediate trackway, received on the rods 20, holds the section T-1 in adjusted positions.

The hinged section T-3 (FIG. 6) of the intermediate trackway has two pairs of eyes 22 on the underside of its rear end and suitable passages 23 adjacent thereto. The posts 1 between which the section T-3 swings have abutments 24 on their inner faces. Pull-down chains 25 can be attached to the chassis of an automobile on the section T-3 passed through the passages 23 and the eyes 22 and about shafts 26 on the chassis of the carrier, to position the rear end of the section T-3 on the abutments 24 when the arch 13-a rests upon the posts 15-a. It is obvious (FIG. 2) that when wedges 18 are inserted between the ends of the arch 13-a and the posts 15-a, chains 25 will serve to fix portion T-3 in adjusted positions above the abutments 24.

A pair of skids S-1 is provided for connecting the portion T-2 of the intermediate trackway with the bridge B. Each of the skids S-1 has its rear end hinged to the portion T-2 and its front end removably attached to the bridge B.

Having described the structural elements which comprise the novel features of my improved trailer, I will now describe its use and operation.

As shown in FIG. 1, the trailer is loaded with four large size automobiles I, II, III and IV, and a station wagon V. It is to be understood that all five vehicles are loaded through the rear end of the trailer, three automobiles being backed onto the trailer and the fourth automobile and the station wagon being driven on forwardly.

The method of loading is as follows:

Bridges B and B-1, skids S and gate G are removed, and skids S-1 are lowered onto portion T-a, and portions T-1, T-2 and T-3 of the intermediate trackway are horizontally aligned. Car I is backed into position at the forward end of the lower trackway and dogged down by the usual pull-down means. Car II is driven into position on the spring mounted portions 4 at the rear end of the lower trackway, and dogged down by the usual pull-down means which depress the portions 4, thus lowering the car II into its fixed travelling position. If the heighth of car II requires, the rear end of the portion T-3 can be lifted by its supporting means to permit car II to be properly positioned on portions 4 of the lower trackway, after which portion T-3 is disposed horizontally.

It is to be understood that cars I and II are moved from the ground to the lower trackway over ordinary skids for loading automobile carriers.

Gate G is mounted on the trailer and skids S are placed to connect gate G and the portion T-3, and the skids from the ground are mounted on gate G. Car III is backed up onto gate G and along skids S and portions T-3, T-2, T-1 and T until its rear wheels are disposed on the platform P at the forward end of the trailer where they are dogged down, the front wheels of car III resting on the portion T-1 of the intermediate trackway. Portion T-1 is depressed until it just clears the top of car I and is then fixed in adjusted position by the use of rods 20 and rod 21 and the pull-down means for the forward wheels of car III.

Bridge B is mounted on the trailer and skids S-1 are raised and attached thereto. It will be understood that the depression of portion T-1 as above described lowers the front end of car III sufficiently for placing bridge B above the front end of car III with proper clearance. Car IV is backed up onto gate G and along skids S, portion T-3, and skids S-1 until its rear wheels are disposed on the bridge B where they are dogged down, the front wheels of car IV resting on portion T-3. Portion T-3, having its supporting means slackened, is depressed by chains 25 until it just clears the top of car II, resting either on wedges 18 or abutments 24.

Bridge B-1 is mounted on the trailer and skids S are placed to connect gate G and bridge B-1 to form an upper trackway. The station wagon V is driven up onto gate G and along skids S until its front wheels are disposed on bridge B-1 and its rear wheels are disposed on skids S above the gate G, and is dogged down.

With the five vehicles loaded, as above described, the trailer is ready to roll.

Should it be desired to condition my improved trailer for carrying four extremely large vehicles, it can be done as follows:

The first vehicle is loaded as car I above described. It is obvious that the available space at the forward end of the lower trackway is sufficient to accommodate a much larger vehicle than car I. This first vehicle can be backed in or driven in forwardly. The second vehicle, with a long wheel base, is loaded as car III above described, one set of wheels resting on the platform P and the other set on the portion T-2, skids S-1 being lowered. It is to be noted that portion T-2 is considerably lower than platform P. Hence the higher portion of the second vehicle must be placed above portion T-2. So, if the second vehicle be a bus, ambulance, hearse or an extremely long station wagon, in which the rear part of the vehicle is higher than the forward part, the vehicle is driven in forwardly, disposing the higher part over portion T-2. However if the vehicle is a pick-up track or the like in which the higher part is forwardly, the vehicle is loaded by being backed in to dispose the higher part over portion T-2.

In order to load the third vehicle, assuming that it is a bus, ambulance, hearse or an extremely long station wagon, having a rear part higher than an ordinary automobile, the skids S are removed, the portion T-3 is raised and fixed in raised position, and the third vehicle is backed in to the rear part of the lower trackway. However, if the third vehicle be a pick-up truck or vehicle with a front part higher than an ordinary automobile, it must be driven in forwardly on the rear part of the lower trackway. This is because the rear part of the lower trackway slopes downwardly forwardly.

When it is desired to provide a longer upper trackway to mount the fourth vehicle having a long wheel base, the bridge B-1 is mounted on the hinges 2, in a forward position, and skids S are placed to connect the brackets 3 with the bridge B-1, and the fourth vehicle is backed or driven forwardly onto the longer upper trackway.

Figure 3:
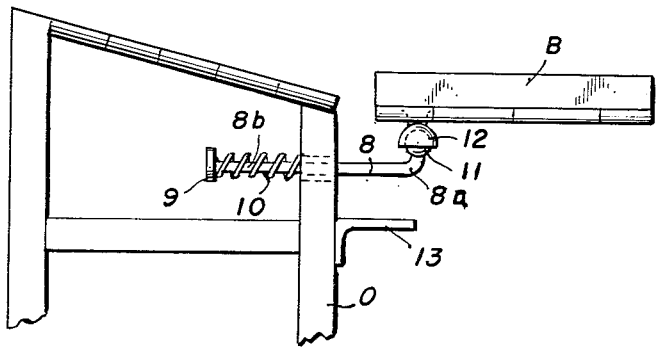
FIG. 3 is an enlarged, fragmentary, side elevation of the forward bridge on its carrying means, the bridge being disposed across the trailer.
Figure 4:
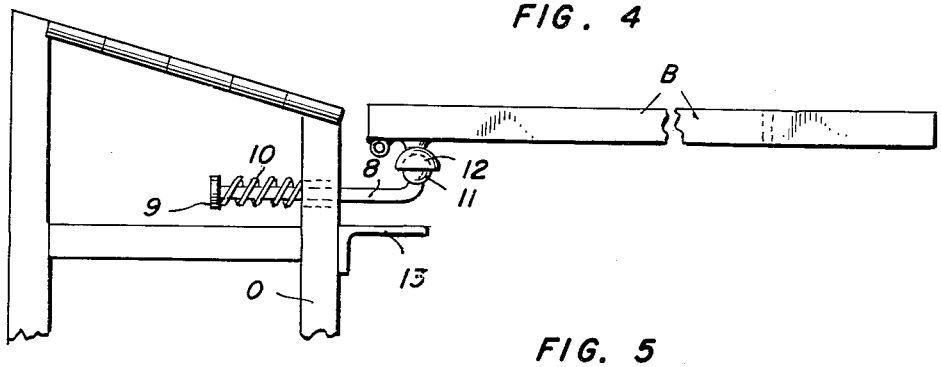
FIG. 4 is a view similar to FIG. 3, the bridge being lengthwise of the trailer.
Figure 5:
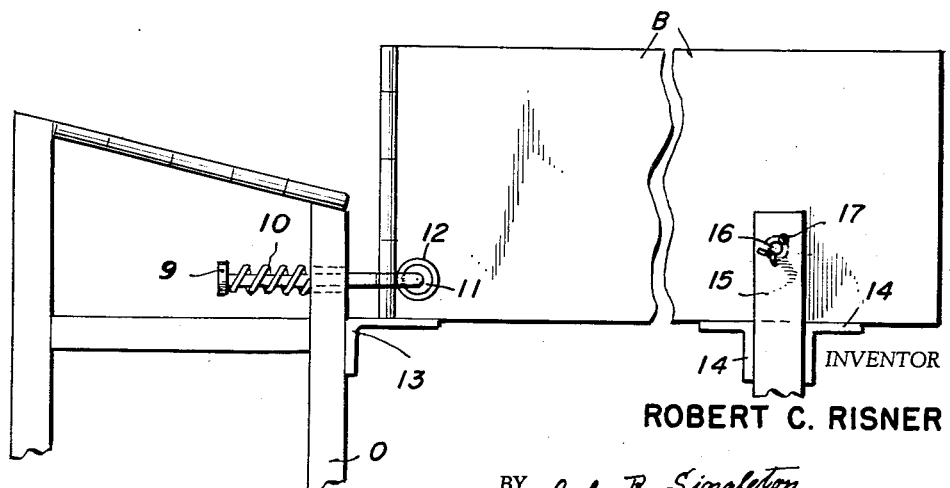
FIG. 5 is a view similar to FIG. 3, the bridge being turned upwardly.

When the carrier is conditioned for loading four vehicles as above described, and it is desired to mount the bridge B for carriage on the trailer in an inoperative position, when its use is not required, this can be done by the holding means 8 to 17, shown in FIGS. 3, 4 and 5. The bridge B is positioned across the trailer and the female member 12 is applied about the male member 11 and rotatably attached thereto in the manner of a conventional towing hitch (FIG. 3). The bridge B is rotated about the member 11 into position lengthwise of the trailer (FIG. 4). The bridge B is turned upwardly, members 11 and 12 causing the rod 8 to rotate in the post O, and the lower edge of the bridge B being received on the bracket 13 at its forward end and on the brackets 14 at its rear end (FIG. 5). The bridge B is fixed in this position by the bolt 16 attached to the ear 15 by its head and its cotter pin 17.

Having described my invention, what I claim is:

1. In an automobile carrier, the combination of a chassis; a trackway mounted on said chassis; a second trackway supported by said chassis above said first trackway, said second trackway having a hinged portion; means mounted on said chassis and adapted to swing said hinged portion relative said chassis; two pairs of posts so mounted on said chassis that said pairs are disposed on the sides of said hinged portion, respectively; two series of pairs of brackets on said pairs of posts, respectively; a pair of rods removably mounted in said two series of pairs of brackets, respectively; a transverse rod fixed on the underside of said hinged section of said second trackway, said transverse rod being slidably supported on said pairs of rods, to fix said hinged section in a plurality of adjusted positions.

2. In an automobile carrier, the combination of a chassis; a trackway mounted on said chassis; a second trackway supported by said chassis above said first trackway, said second trackway having a removable section; a set of posts comprising two pairs of posts so mounted on said chassis that said pairs are disposed on the sides of said chassis, respectively, and extend upwardly above said second trackway; a second set of posts comprising a pair of posts so mounted on said chassis as to be disposed forwardly of said first set of posts; a bridge removably mounted alternatively on said first set and said second set of posts; a gate removably mounted at the rear end of said chassis; and a pair of brackets supported on said chassis in front of said gate, said removable section of said second trackway being adapted to be disposed in one position to connect the remainder of said second trackway with said gate, in a second position to provide a third trackway by connecting said gate with said bridge when said bridge is mounted on said first set of posts, and in a third position to provide said third trackway when said bridge is mounted on said second set of posts and said removable section has its forward end mounted on said bridge and its rear end mounted on said brackets.

References Cited in the file of this patent

UNITED STATES PATENTS

| | | |
|---|---|---|
| 1,809,557 | Lishon | June 9, 1931 |
| 1,978,287 | Thomas | Oct. 23, 1934 |
| 2,694,597 | Kunz | Nov. 16, 1954 |
| 2,750,225 | Mettetal | June 12, 1956 |
| 2,766,898 | Risner | Oct. 16, 1956 |
| 2,841,436 | Stuart | July 1, 1958 |